United States Patent
Wang et al.

(10) Patent No.: US 11,895,578 B2
(45) Date of Patent: Feb. 6, 2024

(54) USER EQUIPMENT DUAL CONNECTIVITY WITH A TERRESTRIAL BASE STATION AND A SATELLITE OR A HIGH-ALTITUDE PLATFORM

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 17/298,474

(22) PCT Filed: Dec. 10, 2019

(86) PCT No.: PCT/US2019/065360
§ 371 (c)(1),
(2) Date: May 28, 2021

(87) PCT Pub. No.: WO2020/123434
PCT Pub. Date: Jun. 18, 2020

(65) Prior Publication Data
US 2022/0030511 A1    Jan. 27, 2022

Related U.S. Application Data

(60) Provisional application No. 62/777,698, filed on Dec. 10, 2018.

(51) Int. Cl.
*H04W 84/06* (2009.01)
*H04W 88/06* (2009.01)
(Continued)

(52) U.S. Cl.
CPC .......... *H04W 48/18* (2013.01); *H04W 40/02* (2013.01); *H04W 84/06* (2013.01); *H04W 88/06* (2013.01)

(58) Field of Classification Search
CPC . H04W 12/0431; H04W 40/02; H04W 40/24; H04W 48/18; H04W 76/16;
(Continued)

(56) References Cited

U.S. PATENT DOCUMENTS 6,128,487 A    10/2000  Wiedeman
6,408,180 B1 *  6/2002  McKenna ................ H01Q 1/28
                                          455/430
(Continued)

FOREIGN PATENT DOCUMENTS

CN    102948233    2/2013
CN    103313353    9/2013
(Continued)

OTHER PUBLICATIONS

"The Study on Integrated Network Architecture in Next Generation Network Services", to Tang Xiaolin; Procedia Engineering, vol. 23, 2011, pp. 180-185, ISSN 1877-7058, https://doi.org/10.1016/j.proeng.2011.11.2486. (https://www.sciencedirect.com/science/article/pii/S187770581105329X) (Year: 2011).*
(Continued)

*Primary Examiner* — Nathan S Taylor
(74) *Attorney, Agent, or Firm* — Colby Nipper PLLC

(57) ABSTRACT

The present disclosure describes systems and methods for a user equipment wirelessly communicating with another user equipment using dual connectivity (DC) with a terrestrial base station and a satellite or high-altitude platform. The described methods and systems include a principal routing manager assessing that different subsets of data, to be transmitted from the user equipment to the other user equipment, can use different, respective qualities of service (QoS) offered through different wireless-communication networks associated with the terrestrial base station and the satellite or high-altitude platform. The principal routing
(Continued)

manager causes a routing command message to be sent to the user equipment, directing the user equipment to enter a state of dual connectivity with the terrestrial base station and the satellite or high-altitude platform and transmit the different of the data in accordance with the QoS offered by the different wireless-communication networks that are associated with the terrestrial base station and satellite or high-altitude platform.

20 Claims, 7 Drawing Sheets

(51) Int. Cl.
*H04W 48/18* (2009.01)
*H04W 40/02* (2009.01)

(58) Field of Classification Search
CPC ... H04W 84/042; H04W 84/06; H04W 88/06; H04W 76/15; H04W 84/04; H04L 45/24; H04L 45/302; H04L 47/78; H04L 65/80; H04L 65/1095; H04L 65/762; H04L 65/75; H04L 9/40
See application file for complete search history.

(56) References Cited

U.S. PATENT DOCUMENTS

| | | | |
|---|---|---|---|
| 7,792,488 B2 | 9/2010 | Karabinis et al. | |
| 9,490,891 B2 | 11/2016 | Frerking et al. | |
| 9,924,424 B2 | 3/2018 | Chuberre et al. | |
| 10,159,107 B2 | 12/2018 | Zacharias et al. | |
| 11,736,997 B2* | 8/2023 | Yang | H04W 36/0069 370/331 |
| 2009/0316621 A1 | 12/2009 | Lane et al. | |
| 2013/0201847 A1* | 8/2013 | Chincholi | H04W 28/08 370/254 |
| 2013/0237226 A1* | 9/2013 | Periyalwar | H04L 69/321 455/552.1 |
| 2014/0315597 A1 | 10/2014 | Periyalwar et al. | |
| 2015/0365878 A1* | 12/2015 | Cho | H04W 76/15 370/254 |
| 2016/0242080 A1 | 8/2016 | Vikberg et al. | |
| 2017/0303330 A1 | 10/2017 | Cho et al. | |
| 2019/0364492 A1* | 11/2019 | Azizi | H04W 68/005 |
| 2020/0178137 A1* | 6/2020 | Hassan Hussein | H04W 36/00835 |
| 2020/0228194 A1* | 7/2020 | Hassan Hussein | H04B 7/18513 |
| 2020/0413451 A1* | 12/2020 | Taherzadeh Boroujeni | H04B 7/18504 |
| 2021/0144612 A1* | 5/2021 | Wei | H04W 16/28 |
| 2021/0376915 A1* | 12/2021 | Mahalingam | H04W 72/542 |
| 2021/0377825 A1* | 12/2021 | Deenoo | H04W 48/12 |
| 2021/0410198 A1* | 12/2021 | Qiao | H04W 74/0841 |

FOREIGN PATENT DOCUMENTS

| | | | |
|---|---|---|---|
| EP | 2637472 | 9/2013 | |
| EP | 2959722 | 10/2018 | |
| KR | 20160140262 | 12/2016 | |
| RU | 2319306 | 3/2008 | |
| RU | 2664407 | 8/2018 | |
| WO | 2011137118 | 11/2011 | |
| WO | 2014129811 | 8/2014 | |
| WO | 2016019970 | 2/2016 | |
| WO | 2017034449 | 3/2017 | |
| WO | WO-2019195457 A1 * | 10/2019 | ......... H04B 7/18504 |
| WO | WO-2020092561 A1 * | 5/2020 | ........... H04B 7/1851 |
| WO | 2020123434 | 6/2020 | |

OTHER PUBLICATIONS

G. Giambene, S. Kota and p. Pillai, "Satellite-5G Integration: A Network Perspective," in IEEE Network, vol. 32, No. 5, pp. 25-31, Sep./Oct. 2018, doi: 10.1109/MNET.2018.1800037. (Year: 2018).*
"Extended European Search Report", EP Application No. 22204271.5, Jan. 11, 2023, 15 pages.
Giovanni, et al., "Satellite-5G Integration: A Network Perspective", Oct. 2018, 7 pages.
Xiaolin, "The Study on Integrated Network Architecture in Next Generation Network Services", Dec. 2011, pp. 180-185.
"Foreign Office Action", RU Application No. 2021116354, dated Dec. 16, 2021, 11 pages.
"International Preliminary Report on Patentability", Application No. PCT/US2019/065360, dated Nov. 6, 2020, 9 pages.
"International Search Report and Written Opinion", PCT Application No. PCT/US2019/065360, dated Feb. 14, 2020, 16 pages.
"Satellite Earth Stations and Systems (SES); Combined Satellite and Terrestrial Networks scenarios", ETSI TR 103 124 V1.1.1 (Jul. 2013), Jul. 2013, 22 pages.
Li, et al., "UAV Communications for 5G and Beyond: Recent Advances and Future Trends", IEEE, Jan. 20, 2019, Jan. 20, 2019, 23 pages.
"Foreign Office Action", in Application No. 202147024558, dated Apr. 1, 2022, 6 pages.
"Foreign Office Action", CN Application No. 201980078703.7, dated Oct. 12, 2023, 18 pages.
Giambene, et al., "Satellite—5G Integration: A Network Perspective", Oct. 31, 2018, 7 pages.

* cited by examiner

500 ⟶

Receive, from a UE that is in a first engaged mode with a first wireless-communication platform of a first wireless-communication network, a message that indicates an upcoming transmission of data from the UE
502

↓

Assess, based on contents of the message, (i) that transmitting a first subset of the data can use a first QoS offered by the first wireless-communication network and (ii) that transmitting a second subset of the data can use a second QoS offered by a second wireless-communication network
504

↓

Transmit, to the UE, a routing command message that directs the UE to (i) enter a second engaged mode with a second wireless-communication platform of the second wireless-communication network while maintaining the engaged mode with the first wireless-communication platform, (ii) transmit the first subset of the data using the first wireless-communication platform and the first wireless network, and (iii) transmit the second subset of the data using the second wireless-communication platform and the second wireless-communication network
506

602
Transmit, by a UE in a first engaged mode with a first wireless-communication platform of a first wireless-communication network and to the first wireless-communication platform, a message that indicates an upcoming transmission of data from the UE

604
Receive, by the UE and from the first wireless-communication platform, a routing command message, and in response and based on contents of the routing command message (i) enter, while maintaining the first engaged mode with the first wireless-communication platform, a second engaged mode with a second wireless-communication platform of a second wireless-communication network, (ii) transmit, using the first wireless-communication platform and a first wireless-communication network, a first subset of the data whose transmission can use a first QoS offered by the first wireless-communication network, and (iii) transmit, using the second wireless-communication platform and the second wireless-communication network, a second subset of the data whose transmission can use a second QoS offered by the second wireless-communication network

Fig. 6

USER EQUIPMENT DUAL CONNECTIVITY WITH A TERRESTRIAL BASE STATION AND A SATELLITE OR A HIGH-ALTITUDE PLATFORM

RELATED APPLICATION(S)

This application is a national stage entry of International Application No. PCT/US2019/065360, filed Dec. 10, 2019, which claims the benefit of U.S. Provisional Application No. 62/777,698, filed Dec. 10, 2018, the disclosures which are incorporated herein by reference in their entirety.

BACKGROUND

Wireless communication is often used to communicate data of different types and priorities between mobile devices. For example, a smartphone may share a recorded video with another smartphone that is executing a video player application by wirelessly transmitting data packets that include, respectively, video content, audio content, and textual content to the other smartphone using a wireless-communication network. As another example, a tablet executing a home security application may receive, in real-time using the wireless-communication network, data packets that include video content from a camera of a home security system and transmit, using the wireless-communication network, data packets that include commands that control or configure the home security system.

In general, wireless-communication networks supporting such wireless communication may be accessed using one of a variety radio access technologies (RATs), examples of which include Third-Generation partnership project long-term evolution (3GPP LTE) radio access technologies, Fifth-Generation New Radio (5G NR) radio access technologies, or Mobile Satellite Service (MSS) radio access technologies.

Wirelessly communicating the different data content may, in certain instances, use different qualities of service (QoS). For example, transmitting data packets containing video content may use a QoS that has a low tolerance for communication latency while transmitting data packets containing textual content may use a QoS that has a high tolerance for communication latency. As another example, transmitting data packets containing audio content may use a QoS that has a high tolerance for data-packet loss while transmitting data packets containing control or command content may use a QoS that has a low tolerance for data-packet loss.

In general, a wireless-communication network may support many levels of QoS. In some instances, a QoS (of the many levels of QoS) may not be suited to wirelessly communicating a type of data content and may be ineffective. In a situation where the wireless-communication network is communicating multiple types of data content, opportunities exist for more efficient distribution of capacity amongst various RATs that are supported by the wireless-communication network.

SUMMARY

This document describes systems and methods for a user equipment (UE) wirelessly communicating with another UE using dual connectivity (DC) with a terrestrial base station and a satellite or high-altitude platform. The described methods and systems include a principal routing manager determining that different subsets of data, to be transmitted from the UE to the other UE, use different, respective qualities of service (QoS) offered through different wireless-communication networks accessed using different radio access technologies (RATs) and that are associated with the terrestrial base station and the satellite or high-altitude platform. The principal routing manager causes a routing command message to be sent to UE, directing the UE to enter a state of dual connectivity with the terrestrial base station and the satellite or high-altitude platform and transmit the different subsets of the data. The different types of data can be sent in accordance with the QoS offered by the different wireless-communication networks that are associated with the terrestrial base station and satellite or high-altitude platform.

In some aspects, a method performed by a terrestrial platform supporting a first wireless-communication network is described. The method includes the terrestrial platform receiving, from a user equipment that is in a first engaged mode with the terrestrial platform, a message that indicates an upcoming transmission of data from the user equipment and assessing, based on contents of the message, that transmitting a first subset of the data can use a first quality of service that is offered by the first wireless-communication network and that transmitting a second subset of the data can use a second quality of service that is offered by a second wireless-communication network. The terrestrial platform then transmits, to the user equipment, a routing command message that directs the user equipment to (i) enter a second engaged mode with a non-terrestrial platform supporting the second wireless-communication network, (ii) transmit the first subset of the data using the terrestrial platform and the first wireless-communication network, and (iii) transmit the second subset of the data using the non-terrestrial platform and the second wireless-communication network.

In other aspects, a method performed by a user equipment that is in a first engaged mode with a first platform supporting a first wireless-communication network is described. The method includes the user equipment transmitting, to the first platform, a message that indicates an upcoming transmission of data from the user equipment and receiving, from the first platform, a routing command message. The method continues with the equipment entering, while maintaining the first engaged mode with the first platform, a second engaged mode using a second platform that is supporting a second wireless-communication network and that is other than the first platform. The user equipment then transmits, using the first platform and the first wireless-communication network, a first subset of the data requiring a first quality of service offered by the first wireless-communication network. Using the second platform and the second wireless-communication network, the user equipment transmits a second subset of the data requiring a second quality of service offered by the second wireless-communication network.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of satellite-based narrow-band communication is described below. The use of the same reference numbers in different instances in the description and the figures may indicate like elements.

FIG. 5 illustrates an example method performed by a wireless-communication platform in accordance with one or more aspects of user equipment dual connectivity with a terrestrial base station and a satellite or high-altitude platform.

FIG. 6 illustrates an example method performed by a user equipment in accordance with one or more aspects of the user equipment's dual connectivity with a terrestrial base station and a satellite or high-altitude platform.

The following discussion describes an operating environment in which methods and systems directed to user equipment dual connectivity with a terrestrial base station and a satellite or high-altitude platform may be implemented. In the context of the present disclosure, reference is made to the operating environment by way of example only.

Operating Environment

Figure 1:
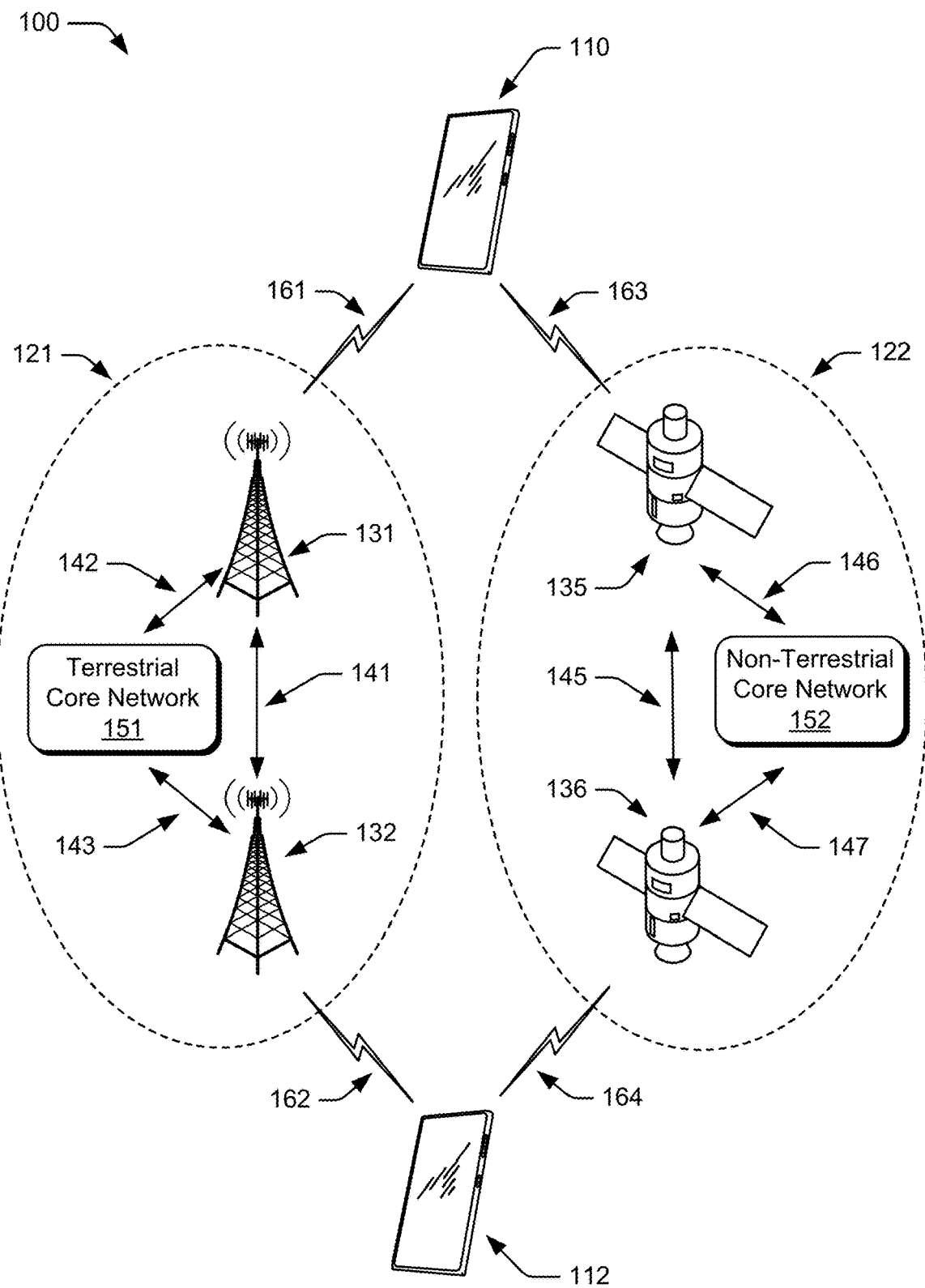
FIG. 1 illustrates an example operating environment in which various aspects of user equipment dual connectivity with a terrestrial base station and a satellite or high-altitude platform may be implemented.

FIG. 1 illustrates an example operating environment 100 in which various aspects of user equipment dual connectivity with a terrestrial base station and a satellite or high-altitude platform may be implemented. The example operating environment 100 includes a user equipment 110 and a terminal device 112 wirelessly communicating data using multiple wireless-communication networks 120, illustrated as wireless-communication networks 121 and 122.

In this example, the user equipment (UE) 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, wearable computer, smart appliance, vehicle-based communication system, and the like. Also, in this example, the terminal device 112 is implemented as a smartphone (e.g., another user equipment). However, and in general, the terminal device can be any device that can receive (or transmit) data via the wireless-communication networks 121 and 122 and may be, for example, a server or other hardware that is associated with a cloud storage service, a content provider (e.g., a video or music content provider), a ground-based destination network, or general internet access.

The UE 110 engages with the first wireless-communication network 121 using a first radio-access technology (RAT) that may operate in accordance with frequencies and protocols that may be associated with a Third-Generation partnership project long-term evolution (3GPP LTE) standard, a Fifth-Generation new radio (5G NR) standard, or any other suitable standard.

The first wireless-communication network 121 may include multiple wireless-communication platforms 130, illustrated as terrestrial base station 131 and terrestrial base station 132, which are terrestrial and are implemented in a macrocell, microcell, small cell, picocell, or the like. Furthermore, the terrestrial base station 131 and the terrestrial base station 132 may be an Evolved Universal Terrestrial Radio Access Network Node B, E-UTRAN Node B, evolved Node B, eNodeB, eNB, Next Generation Node B, gNode B, or a gNB terrestrial base station. The terrestrial base station 131 and the terrestrial base station 132 may communicate with elements of the wireless first wireless-communication network 121 by way of one or more interfaces 140 (illustrated as interface 141, interface 142, and interface 143). Interface 141 may be, for example, an Xn interface, an X2 interface, or the like. Interfaces 142 and 143 connect terrestrial base station 131 and terrestrial base station 132, respectively, to a core network 150 (illustrated as terrestrial core network 151), which may include hardware of one or more servers, routers, switches, control elements, and the like that operate in accordance with frequencies and protocols that might be associated with a particular radio-access technology (RAT) standard. In the instance where the terrestrial core network 151 is operating in accordance with protocols and frequencies that can be associated with Fifth Generation New Radio (5G NR) standard, for example, interfaces 142 and 143 may include a combination of an NG2 interface for control-plane signaling and an NG3 interface for user-plane data communications. In the instance where the terrestrial core network 151 is operating in accordance with protocols and frequencies that might be associated with a Third-Generation partnership project long-term evolution (3GPP LTE) standard, interfaces 142 and 143 may include an S1 interface for control-plane signaling and user-plane data communications.

In general, the first wireless-communication network 121 performs to a service level that corresponds to a first quality of service (QoS). Based on factors such as wireless-communication frequencies, wireless-communication congestion levels, terrestrial interferences, distances between the wireless-communication platforms 130 (e.g., the terrestrial base station 131 and the terrestrial base station 132), wireless-communication signal strengths, and the like, a first QoS is attributable to the first wireless-communication network 121. Factors such as a wireless-communication latency, a data-packet loss rate, or the like, may quantify the first QoS.

The UE 110 further engages with a second wireless-communication network 122 using a second radio-access technology (RAT) that may operate in accordance with frequencies and protocols that might be associated with a Mobile Satellite Service (MSS) or the like. Furthermore, the second wireless-communication network 122 may include one or more wireless-communication platforms 130, illustrated as satellite 135 and satellite 136, which are non-terrestrial and may be, for example, a low earth orbit (LEO) satellite, a medium earth orbit (MEO) satellite, or a geostationary earth orbit (GEO) satellite. The satellite 135 and the satellite 136 communicate with elements of the second wireless-communication network 122 by way of one or more interfaces 140 (illustrated as interface 145, interface 146, and interface 147). Interface 145 supports an inter-satellite link (ISL) connecting satellite 135 and satellite 136 and may be, for example, an optical interface, a laser interface, or a radio-frequency (RF) interface. Interfaces 146 and 147 support gateway links (GWLs) connecting satellite 135 and satellite 136, respectively, to a network 150 (illustrated as core non-terrestrial network 152), which may include hardware of one or more satellite ground stations, servers, routers, switches, control elements, and the like. Interfaces 146 and 146 may be, for example, Consultative Committee for Space Data Systems (CCSDS) interfaces.

In general, the second wireless-communication network 122 performs to a service level that corresponds to a second quality of service (QoS). Based on factors such as wireless-communication frequencies, wireless-communication congestion levels, distances between the wireless-communication platforms 130 (e.g., the satellite 135 and the satellite 136), wireless-communication signal strengths, and the like, a second QoS is attributable to the second wireless-communication network 122. Factors such as a wireless-communication latency, a data-packet loss rate, or the like, may quantify the second QoS.

UE 110 may engage to the wireless-communication networks 120 (e.g., the first wireless-communication network 121 and the second wireless-communication network 122) by way of multiple wireless links 160, illustrated as wireless link 161, 162, 163, and 164. Each wireless link 160 can include a downlink radio connection and an uplink radio connection.

As illustrated and as part of dual-connectivity, the UE 110 is in a first engaged mode with the terrestrial base station 131 of the first wireless-communication network 121 by way of the wireless link 161 and in a second engaged mode with the satellite 135 of the second wireless-communication network 122 by way of the wireless link 163 (the wireless link 163 to the satellite 135 may sometimes be referred to as a mobile user link (MUL)). It is worth noting that such engagement modes (e.g., the first engaged mode and the second engaged mode) may correspond to engaged modes (or "connected" modes) as defined by respective RAT protocols and standards. In simple terms, an engaged mode may signify that an ongoing wireless connection has been established between the UE 110 and the terrestrial base station 131 and/or the satellite 135.

In an instance where the UE 110 uses a same RAT to engage with the terrestrial base station 131 and the satellite 135, the UE 110 may be in a single engaged mode. For example, if the UE 110 is engaged with the base station 131 and the satellite 135 using a 5G NR RAT, the UE 110 may be in an RRC_Connected mode as defined by 5G NR wireless protocols and standards. In such an instance, the separate wireless links 161 and 163 may occur at physical (PHY), media access control (MAC), radio link control (RLC), or packet data convergent protocol (PDCP) layers that conform to 5G NR wireless protocols and standards.

The wireless-communication platforms of the second wireless-communication network may, as an alternative to satellites (e.g., the satellite 135 and the satellite 136), include high-altitude platforms (HAPs), such as stratospheric balloons, blimps, or the like (not illustrated in FIG. 1). In the instance of a second wireless-communication network that includes HAPs, the QoS may not necessarily be the same as that in the instance of the second wireless-communication network that includes satellites.

Example Systems

Figure 2:
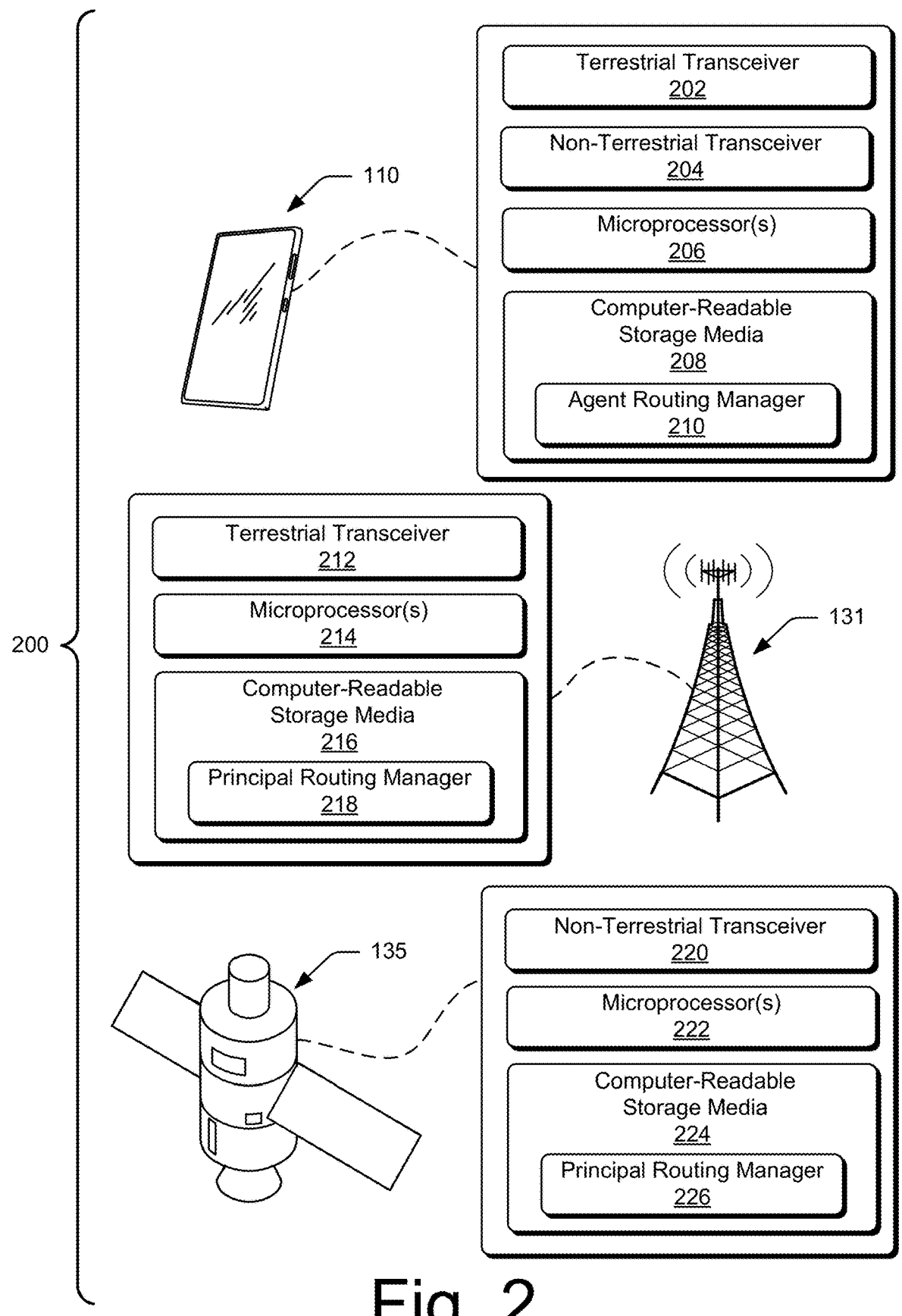
FIG. 2 illustrates example device diagrams in accordance with one or more aspects of user equipment dual connectivity with a terrestrial base station and a satellite or high-altitude platform.

FIG. 2 illustrates example device diagrams 200 in accordance with one or more aspects of user equipment dual connectivity with a terrestrial base station and a satellite or high-altitude platform. The devices may correspond to devices of the example operating environment 100 illustrated by FIG. 1.

The UE 110 includes a terrestrial transceiver 202 and also includes a non-terrestrial transceiver 204. Each respective transceiver 202 and 204 may include one or more antennas and radio frequency front ends that can be tuned to one or more frequency bands defined by respective communication standards. As an example, the terrestrial transceiver 202 may be tunable to one or more frequency bands defined by the 3GPP LTE and 5G NR communication standards for terrestrial wireless communications while non-terrestrial transceiver 204 may be tunable to one or more frequency bands defined by MSS communication standards for non-terrestrial wireless communications.

The UE 110 also includes microprocessor(s) 206 and computer-readable storage media 208 (CRM 208). The microprocessor 206 may be a single core processor or a multiple core processor composed of a variety of materials, such as silicon, polysilicon, high-K dielectric, copper, and so on. The computer-readable storage media 208 described herein excludes propagating signals. The CRM 208 may include any suitable memory or storage device such as random-access memory (RAM), static RAM (SRAM), dynamic RAM (DRAM), non-volatile RAM (NVRAM), read-only memory (ROM), or Flash memory. The CRM 208 also includes an agent routing manager 210. Alternately or additionally, the agent routing manager 210 may be implemented in whole or part as hardware logic or circuitry integrated with or separate from other components of the UE 110. The agent routing manager 210 may configure the UE 110 to implement the techniques for dual connectivity to different wireless-communication platform(s) 130 as described herein. Alternatively, the agent routing manager 210 configures the UE 110 to separate and transmit (or receive and aggregate) different subsets of data that may be communicated using different wireless-communication networks(s) 120 having different, respective QoS(s).

The terrestrial base station 131 includes a terrestrial transceiver 212. The terrestrial transceiver 212 may include one or more antennas and radio frequency front ends that can be tuned to frequency bands defined by the 3GPP LTE and 5G NR communication standards for terrestrial wireless communications.

The terrestrial base station 131 also includes a microprocessor 214 and computer-readable storage media 216 (CRM 216). The microprocessor 214 may be a single core processor or a multiple core processor composed of a variety of materials, such as silicon, polysilicon, high-K dielectric, copper, and so on. The computer-readable storage media 216 described herein excludes propagating signals. The CRM 216 may include any suitable memory or storage device such as random-access memory (RAM), static RAM (SRAM), dynamic RAM (DRAM), non-volatile RAM (NVRAM), read-only memory (ROM), or Flash memory. The CRM 216 also includes a principal routing manager 218. The principal routing manager 218 may be implemented in whole or part as hardware logic or circuitry integrated with, or separate from, other components of the terrestrial base station 131. The principal routing manager 218 makes data routing determinations based on a useable QoS and transmits routing command messages to the UE 110. The principal routing manager 218 may configure the terrestrial base station 131 to implement the techniques of dual connectivity as described herein.

The satellite 135 includes a non-terrestrial transceiver 220. The non-terrestrial transceiver 220 may include antennas and radio frequency front ends that can be tunable to frequency bands defined by the MSS communication standards for non-terrestrial wireless communications.

The satellite 135 also includes a microprocessor 222 and computer-readable storage media 224 (CRM 224). The microprocessor 222 may be a single core processor or a multiple core processor composed of a variety of materials, such as silicon, polysilicon, high-K dielectric, copper, and so on. The computer-readable storage media 224 described herein excludes propagating signals. The CRM 224 may include any suitable memory or storage device such as random-access memory (RAM), static RAM (SRAM), dynamic RAM (DRAM), non-volatile RAM (NVRAM), read-only memory (ROM), or Flash memory. The CRM 224 also includes a principal routing manager 226. The principal routing manager 226 may be implemented in whole or part as hardware logic or circuitry integrated with or separate from other components of the satellite 135. The principal routing manager 226 makes data routing determinations based on a useable QoS and may transmit routing command messages to the UE 110. The principal routing manager 226 may configure the satellite 135 to implement the techniques of dual connectivity as described herein.

An alternative (not illustrated) to the satellite 135 is a high-altitude platform (HAP) such as a blimp, stratospheric balloon, or the like. However, and in general, the HAP includes similar elements to those illustrated and associated with the satellite 135 (e.g., the HAP includes a non-terrestrial transceiver, a microprocessor, and a computer-readable storage media having a principal routing manager).

Example Methods

Figure 3:
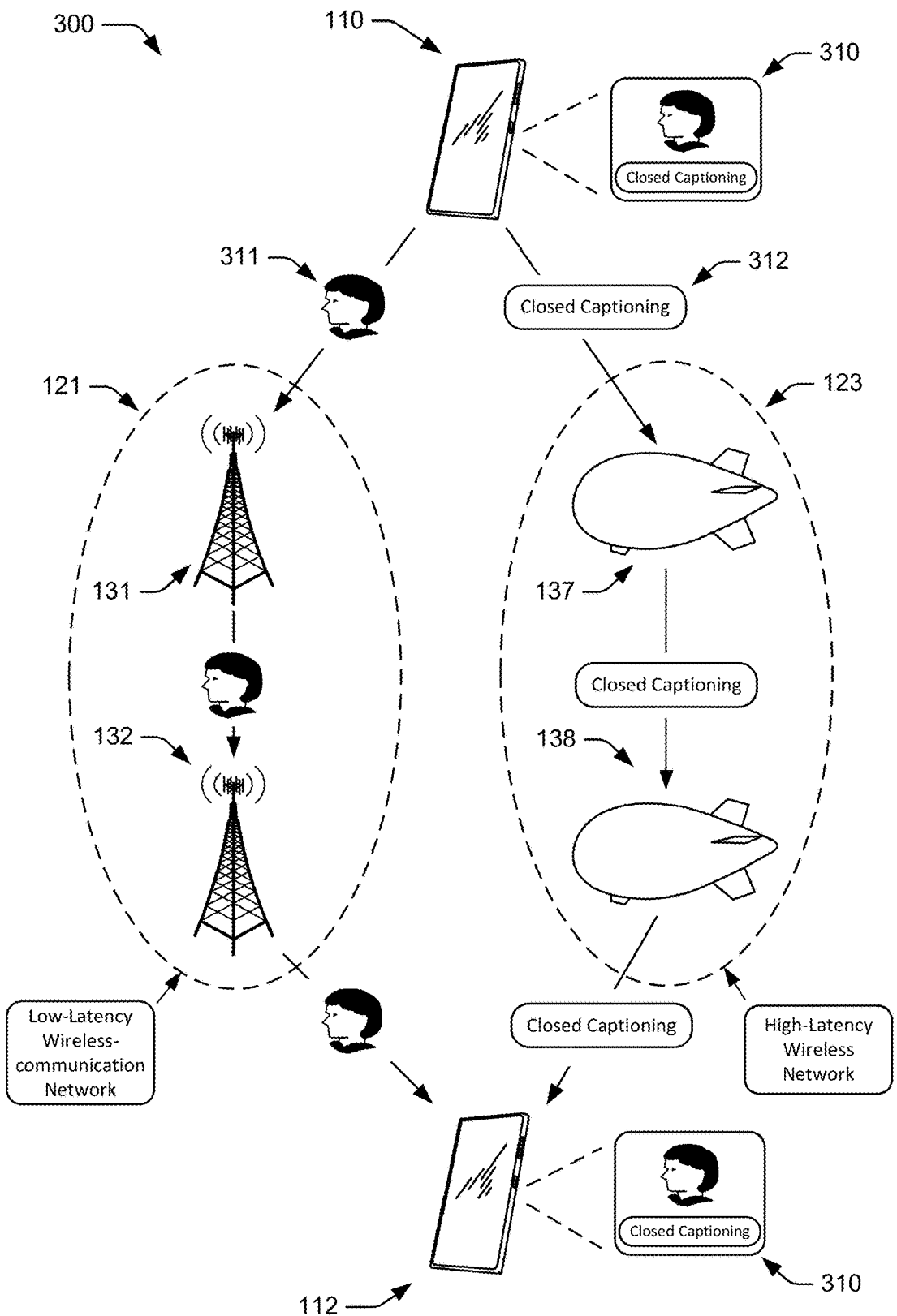
FIG. 3 illustrates an example of different data types being transmitted in accordance with one or more aspects of user equipment dual connectivity with a terrestrial base station and a satellite or high-altitude platform.

FIG. 3 illustrates an example 300 of different data types being transmitted in accordance with one or more aspects of user equipment dual connectivity with a terrestrial base station and a satellite or high-altitude platform. The example 300 may include elements of FIG. 1 and FIG. 2. For simplicity, elements directed to core network(s) 150, interface(s) 140, and wireless link(s) 160 are omitted from FIG. 3.

As illustrated, the UE 110 is transmitting data 310 to a terminal device (e.g., the terminal device 112). The data 310 is a media file that contains a first subset 311 of the data 310 that is video content and a second subset 312 of the data 310 that is textual content (illustrated as closed captioning).

The first subset 311 of the data 310 is transmitted to the terminal device 112 using the first wireless-communication network 121 described by FIG. 1. In this example instance, the first wireless-communication network 121 is accessed using a first radio-access technology (RAT), such as a 5G NR RAT or a 3GPP LTE RAT. Furthermore, a QoS inherent to the first wireless-communication network 121 may have low-latencies that are suited for wireless-communication of the first subset 311 (e.g., the video content) of the data 310 from the UE 110 to the terminal device 112.

The second subset 312 of the data 310 is transmitted to the terminal device 112 using a second wireless-communication network 123. In this example instance, and as an alternative to wireless-communication platform(s) 130 that are satellites (e.g., the satellite 135 and the satellite 136 of FIG. 1), the second wireless-communication network 123 comprises wireless-communication platform(s) 130 that are high-altitude platforms and illustrated as a blimp 137 and a blimp 138. In this example instance, the second wireless-communication network 123 is accessed using a second radio-access technology (RAT) that can be, for example, a Mobile Satellite Service (MSS) RAT or a Sixth-Generation (6G) RAT. Furthermore, a QoS inherent to the second wireless-communication network 123 may have high wireless-communication latencies that are suited for wireless-communication of the second subset 312 (e.g., the video content) of the data 310 from the UE 110 to the terminal device 112.

It this example, the UE 110 is dually connected to the terrestrial base station 131 and the blimp 137 by way of a set of wireless links 160 (as illustrated in FIG. 1). Such dual connectivity may, in general, correspond to a respective engaged mode as supported by each, respective RAT of the first wireless-communication network 121 and the second wireless-communication network 123. Example aspects of such dual connectivity will later be described in greater detail.

In this example, and also as illustrated in FIG. 3, the terminal device 112 receives, from the terrestrial base station 132 of the first wireless-communication network 121, the first subset 311 (e.g., the video content) of the data 310. The terminal device 112 also receives, from the blimp 138 of the second wireless-communication network 123, the second subset 312 (e.g., the textual content) of the data 310. The terminal device 112 may further perform operations to combine or aggregate the first subset 311 of the data 310 with the second subset 312 of the data 310 and the replicate and present the data 310 in its entirety.

Techniques illustrated by FIG. 3 can be extended to a multi-connective environment that supports partitioning of networks (e.g., network slices), allowing improved grouping of wireless-communication traffic and isolation of data. In such an environment, the first subset of the data and the second subset of the data each correspond to a respective network slice. In other words, the first subset of the data is transmitted via a first network slice, and the first subset of the data is transmitted via a second network slice. The first and second network slices may be defined by partitioning the resources of the first and second wireless-communication networks, respectively, such that each wireless-communication network supports a respectively plurality of network slices.

As an example (not illustrated), the UE 110 can be engaged with the terrestrial base station 131 (and transmit data using the wireless-communication network 121), the satellite 135 (and transmit data using the wireless-communication network 122), and the blimp 137 (and transmit data using the wireless-communication network 123). In such an example instance, the UE 110 transmits data corresponding to an ultra-reliable low latency communication (URLLC) slice using the wireless-communication network 121, data corresponding to a massive machine-type communications (mMTC) slice using the wireless-communication network 122, and data corresponding to an enhanced mobile broadband (eMBB) slice using the wireless-communication network 123. Examples of data corresponding to the URLLC slice include data having strict needs with regards to latency and reliability, such as tele-surgery data, intelligent transportation data, data for controlling frequency and voltage in smart grids, industry automation data, and the like. An example of data corresponding to the mMTC slice includes data needed to support a large number of devices and that is communicated intermittently, such as internet-of-things (IoT) data. Examples of data corresponding to the eMBB slice include data requiring high data rates, such as in-vehicle infotainment, live streaming of data, and the like.

Figure 4:
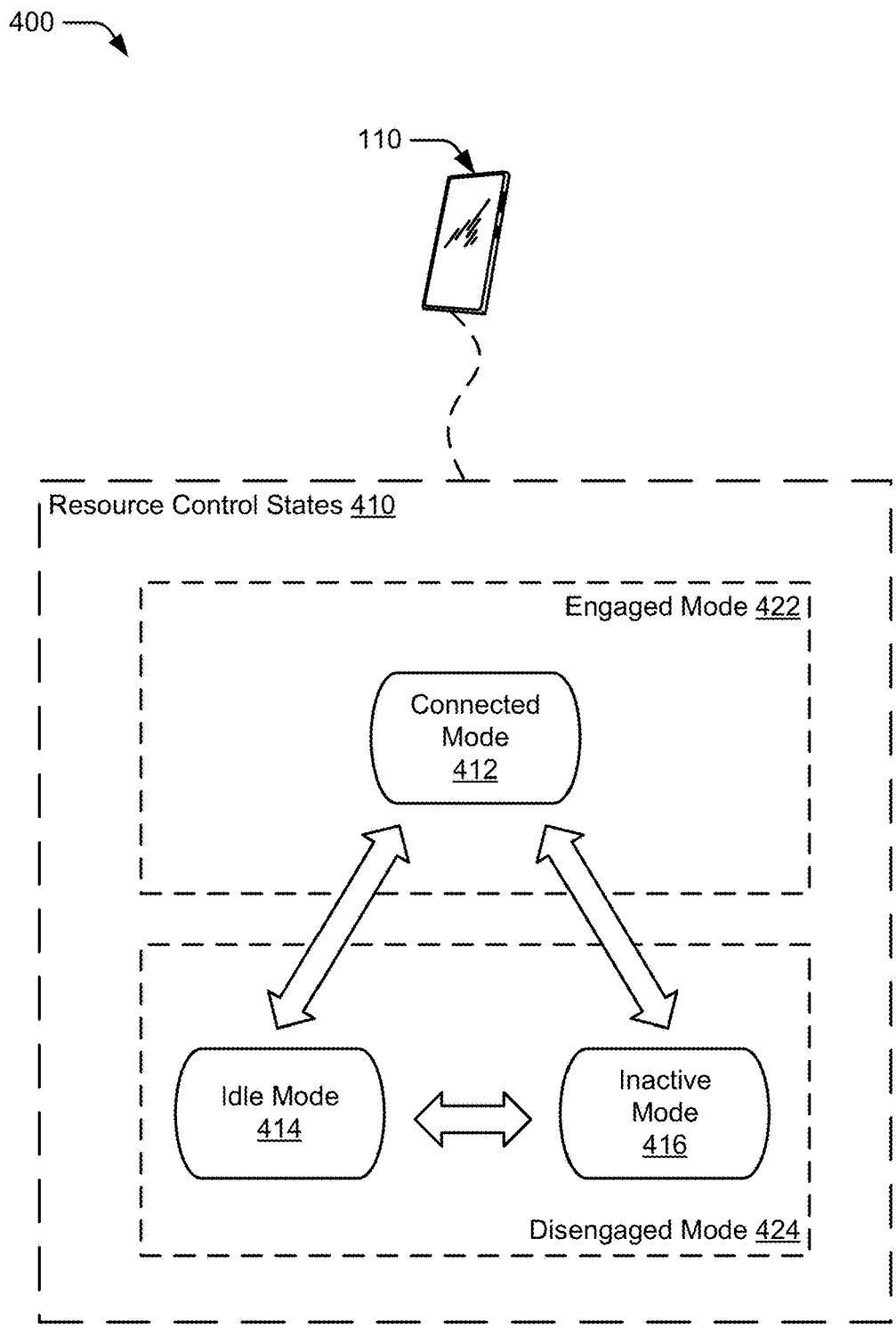
FIG. 4 illustrates example details of user equipment states of a user equipment wirelessly-communicating with a terrestrial base station, satellite, or high-altitude platform.

FIG. 4 illustrates example details 400 of user equipment states of a user equipment wirelessly-communicating with a terrestrial base station, satellite, or high-altitude platform. To communicate wirelessly with a wireless-communication network 120 (e.g., the wireless-communication network 121 or 122 of FIG. 1), a user equipment 110 (e.g., the UE 110 of FIG. 1) may utilize a radio resource control (RRC) procedure or the like to establish a connection with a wireless-communication platform 130 of the wireless-communication network (e.g., the terrestrial base station 131 or the satellite 135 of FIG. 1). In the instance of dual-connectivity, the user equipment 110 may establish concurrent wireless connections with two wireless-communication platforms (e.g., the wireless links 161 and 162 of FIG. 1).

Upon establishing the connection to the wireless-communication network 120, the UE 110 enters a connected mode associated with a radio-access technology. For example, for a 5G NR or 3GPP LTE radio-access technology, the engaged mode may correspond to an RRC-connected mode, RRC_CONNECTED state, NR-RRC CONNECTED state, or E-UTRA RRC CONNECTED state.

The UE 110 operates according to different resource control states 410. Different situations may occur that cause the UE 110 to transition between different resource control states 410 as associated with a radio-access technology (RAT). Examples of the resource control states 410 illustrated in FIG. 4, as associated with a 5G NR RAT or a 3GPP LTE RAT, include a connected mode 412, an idle mode 414, and an inactive mode 416. The user equipment 110 is either in the connected mode 412 or in the inactive mode 416 when an RRC connection is active. If an RRC connection is not active, then the user equipment 110 is in the idle mode 414.

In establishing the RRC connection, the user equipment 110 may transition from the idle mode 414 to the connected mode 412. After establishing the connection, the user equipment 110 may transition (e.g., upon connection inactivation) from the connected mode 412 to an inactive mode 416 and the user equipment 110 may transition (e.g., using an RRC connection resume procedure) from the inactive mode 416 to the connected mode 412. After establishing the connection, the user equipment 110 may transition between the connected mode 412 to the idle mode 414, for instance upon the network releasing the RRC connection. Further, the user equipment 110 may transition between the inactive mode 416 and the idle mode 414.

Further, the user equipment 110 may be in an engaged mode 422 or may be in a disengaged mode 424. As used herein, the engaged mode 422 is a connected mode (e.g., the connected mode 412) and a disengaged mode 424 is an idle, disconnected, connected-but-inactive, connected-but-dormant mode (e.g., the idle mode 414, the inactive mode 416). In some cases, in the disengaged mode 424, the UE 110 may still be registered at a Non-Access Stratum (NAS) layer with radio bearer active (e.g., the inactive mode 416).

Each of the different resource control states 410 may have different quantities or types of resources available, which may affect power consumption within the user equipment 110. In general, the connected mode 412 represents the user equipment 110 actively connected to (e.g., engaged with) the wireless-communication platform 130. In the inactive mode 416, the user equipment 110 suspends connectivity with the wireless-communication platform 130 and retains information that enables connectivity with the wireless-communication platform 130 to be quickly re-established. In the idle mode 414 the UE 110 releases the connection with the wireless-communication platform 130.

Some of the resource control states 410 may be limited to certain radio access technologies. For example, the inactive mode 416 may be supported in LTE Release 15 (eLTE) and 5G NR, but not in 3G or previous generations of 4G standards. Other resource control states may be common or compatible across multiple radio access technologies, such as the connected mode 412 or the idle mode 414.

FIG. 5 illustrates an example method 500 performed by a wireless-communication platform in accordance with one or more aspects of user equipment dual connectivity with a terrestrial platform and a non-terrestrial platform. Furthermore, the wireless-communication platform may be a first wireless-communication platform that is part of a first wireless-communication network. Although the first wireless-communication platform may be a wireless-communication platform such as the terrestrial base station 131 or the satellite 135 of FIG. 1 (as well as the blimp 137 of FIG. 3), the method 500 will described in the context of the terrestrial base station 131 and FIG. 1.

At operation 502, the first wireless-communication platform (e.g., the terrestrial base station 131) receives (using the terrestrial transceiver 212) a message from a user equipment (e.g., the user equipment 110) that is in a first engaged mode with the first wireless-communication platform. The message includes information that indicates an upcoming transmission of data from the user equipment 110.

In some instances, the message may be an explicit message containing contents that include scheduling information (e.g., a future time of transmission), a file size or type, or a useable QoS. The useable QoS may indicate a minimum QoS required for the transmission. As another example, the message may be embedded in a file containing the data to be transmitted, in which instance such contents may be included as part of a header, data frame, or data packet that is part of the file.

At operation 504, the first wireless-communication platform assesses, based on the contents of the message (using the microprocessor 214 executing the code or instructions of the principal routing manager 218 contained in the CRM 216), that transmitting a first subset of the data can use a first quality of service that is offered by the first wireless-communication network (e.g., the wireless-communication network 121). The first wireless-communication platform also assesses that transmitting a second subset of the data can use a second quality of service that is offered by a second wireless-communication network (e.g., the wireless-communication network 122). Operation 504 may include determining, by the first wireless-communication platform, that the first wireless-communication network has a first QoS that is suitable for transmitting the first subset of the data, and the second wireless-communication network has a second QoS that is suitable for transmitting the second subset of the data.

As non-limiting examples, respective wireless-communication network QoS(s) may be provided to the first wireless-communication platform by a core network (e.g., the terrestrial core network 151). In other instances, respective wireless-communication network QoS(s) may be provided to the first wireless-communication platform by the user equipment.

Furthermore, and in some instances as part of operation 504, the first wireless-communication platform may determine available capacity of the second wireless-communication network. A determination of the available capacity may serve as a basis for the first wireless-communication platform to manage routing of data in the event multiple, wireless-communication networks having similar characteristics (e.g., wireless-communication networks that have a similar QoS, that include a similar RAT, or the like) are accessible to the user equipment.

At operation 506, the first wireless-communication platform transmits (using the terrestrial transceiver) a routing command message to the user equipment. The routing command message may include scheduling information, security or cryptography keys, an identity of the second wireless-communication network, an identity of a second wireless-communication platform associated with the second wireless-communication network, (e.g., the satellite 135), or identifiers or partitioning instructions associated with the first subset of the data and the second subset of the data. The partitioning instructions may identify the first and second subsets of the data. The partitioning instructions thus direct the user equipment to transmit a specific portion of the data via the first wireless-communication network and to transmit another specific portion of the data via the second wireless-communication network.

The routing command message directs the user equipment to enter a second engaged mode with the second wireless-communication platform of the second wireless-communication network while maintaining the first engaged mode with the first wireless-communication platform. As part of entering the second engaged mode with the second wireless-communication platform, wireless communications may occur between the user equipment and the second wireless-communication platform that include one or more of an engagement request message, an engagement acknowledgment (ACK) message, or the like.

Continuing with the operation 506, the user equipment is also caused to transmit, to the terminal device, the first subset of the data using the first wireless-communication platform and the first wireless-communication network. The user equipment is also caused to transmit, to the terminal device, the second subset of the data using the second wireless-communication platform and the second wireless-communication network. In this manner, the available communication resources are used more efficiently, by transmitting the first and second subsets of the data using a respective wireless-communication network that is most suited to satisfying the QoS requirements of each subset.

Although example method 500 is described in the context of the first wireless-communication platform being the terrestrial base station 131 and the second wireless-communication platform being the satellite 135, permutations of the method allow for role reversal (e.g., the first wireless-communication platform may be the satellite 135 and the second wireless-communication platform may be the terrestrial base station 131). Furthermore, the example method 500 may include instances where the first engaged mode with the first wireless-communication platform uses a first radio access technology and the second engaged mode with the second wireless-communication platform uses a second radio access technology.

FIG. 6 illustrates an example method 600 performed by a user equipment in accordance with one or more aspects of user equipment dual connectivity with a terrestrial base station and a satellite or high-altitude platform. Although the first wireless-communication platform may be a wireless-communication platform such as the terrestrial base station 131 or the satellite 135 of FIG. 1 (as well as the blimp 137 of FIG. 3), the method 600 will described in the context of the terrestrial base station 131 and FIG. 1.

At operation 602, the user equipment (e.g., the user equipment 110) transmits (using the terrestrial transceiver 202) a message to a first wireless-communication platform (e.g., the terrestrial base station 131) of a first wireless-communication network. The user equipment is in a first engaged mode with the first wireless-communication platform and the message includes information that indicates an upcoming transmission of data from the user equipment 110.

For example, the message may be an explicit message having contents that include one or more of scheduling information (e.g., a future time of transmission), a file size or type, or a useable QoS. As another example, the message may be embedded in a file containing the data to be transmitted, in which instance such contents may be included as part of a header, data frame, or data packet that is part of the file.

At operation 604, the user equipment receives (using the terrestrial transceiver 202) a routing command message from the first wireless-communication platform. The routing command message may include one or more of scheduling information, security or cryptography keys, an identity of a second wireless-communication network, an identity of a second wireless-communication platform (e.g., the satellite 135) associated with the second wireless-communication network, (e.g., the wireless-communication network 122), an indication of a second radio-access technology to be used when engaging the second wireless-communication platform, or identifiers or partitioning instructions to be applied to the upcoming transmission of the data.

In response to receiving the routing command message and based on contents of the routing command message, the user equipment (using the microprocessor 206 executing the code or instructions of the agent routing manager 210 contained in the CRM 208) enters a second engaged mode with the second wireless-communication platform using the second radio-access technology while maintaining the first engaged mode with the first wireless-communication platform. As part of entering the second engaged mode with the second wireless-communication platform, wireless communications may occur between the user equipment and the second wireless-communication platform which include one or more of the user equipment transmitting an engagement request message to the second wireless-communication platform and receiving an engagement acknowledgment (ACK) message from the second wireless-communication platform.

Continuing with operation 604 the user equipment transmits, to the terminal device using the first wireless-communication platform and the first wireless-communication network, a first subset of the data that can use a first QoS offered by the first wireless-communication network. The user equipment also transmits, to the terminal device using the second wireless-communication platform and the second wireless-communication network, a second subset of the data that can use a second QoS offered by the second wireless-communication network.

Although the example method 600 is described in the context of the first wireless-communication platform being the terrestrial base station 131 and the second wireless-communication platform being the satellite 135, permutations of the method allow for role reversal (e.g., the first wireless-communication platform may be the satellite 135 and the second wireless-communication platform may be the terrestrial base station 131).

Signaling and Control Transactions

Figure 7:
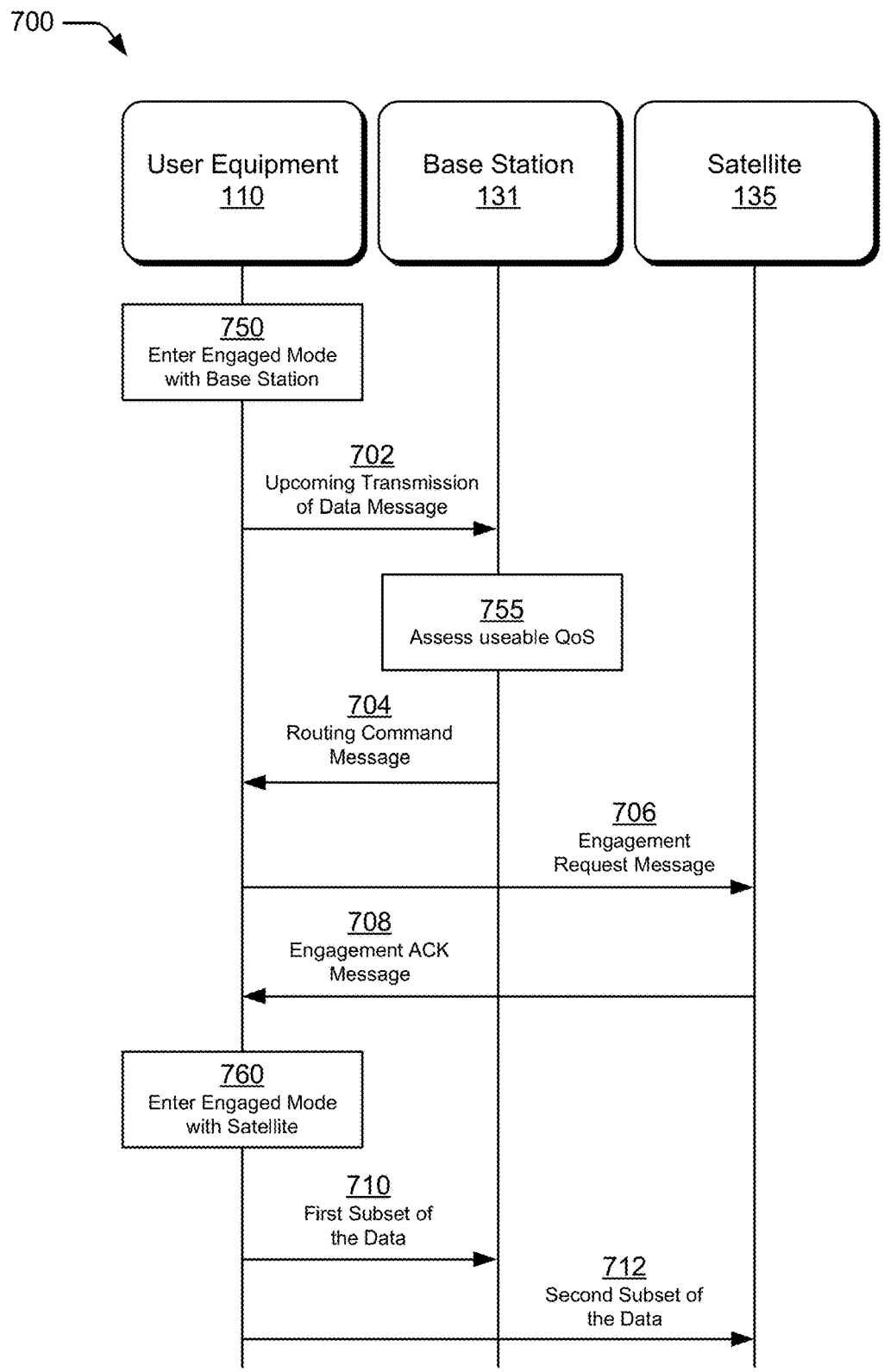
FIG. 7 illustrates details of example signaling and control transactions associated with a user equipment having dual connectivity with a terrestrial base station and a satellite or high-altitude platform.

FIG. 7 illustrates details 700 of example signaling and control transactions associated with a user equipment having dual connectivity with a terrestrial base station and a satellite or high-altitude platform. Although multiple combinations and permutations of the user equipment having such dual connectivity are possible, FIG. 7 is illustrated in the context of the user equipment 110, the terrestrial base station 131, and the satellite 135 of FIG. 1. The user equipment 110, the terrestrial base station 131, and the satellite 135 may wirelessly communicate and format the signaling and control transactions in accordance with data frames or subframes of wireless-communication protocols associated with respective radio access technologies.

At 702, and after entering an engaged mode with the terrestrial base station at 750, the user equipment 110 transmits, to the terrestrial base station 131, a message that indicates an upcoming transmission of data to a terminal device (e.g., to the user equipment 112, not illustrated). The message at 702 may be an explicit message containing contents that include scheduling information (e.g., a future time of transmission), a file size or type, or a useable QoS corresponding to a minimum-allowable data-packet loss or a minimum-allowable communication latency. As another example, the message may be embedded in a file containing the data to be transmitted, in which instance such contents may be included as part of a header, data frame, or data packet that is part of the file.

At 704, and after the terrestrial base station 131 assesses useable QoS's for upcoming transmission of the data at 702, the terrestrial base station 131 transmits, to the user equipment 110, a routing command message. The routing command message may include scheduling information, security or cryptography keys, an identity of a second wireless-communication network, an identity of the satellite 135, an indication of a second radio-access technology to be used when accessing the second wireless-communication network using the satellite 135, or identifiers or partitioning instructions to be applied to the upcoming transmission of the data.

At 706, the user equipment 110 sends an engagement request message to the satellite 135. The engagement request message may include, for example, an identity of the user equipment 110, scheduling information, security or cryptography keys, information directed to a subset of data to be transmitted from the user equipment 110 to the satellite 135.

At 708, the satellite 135 sends an engagement acknowledgment (ACK) message to the user equipment 110. The engagement acknowledgment message may include, for example, grants and permissions for the user equipment 110 to engage with the satellite 135.

At 710 and 712 respectively, and after entering the engaged mode with the satellite 135, the user equipment transmits a first subset of the data to the terrestrial base station 131 and a second subset of the data to the satellite 135. The terrestrial base station 131 and the satellite 135 then, accordingly, transmit the respective subsets of data using their respective networks to the user equipment 112 (not illustrated).

The described signaling and control transactions are by way of example only, and are not constrained by the sequence or order of presentation unless otherwise noted. Furthermore, in certain aspects, additional signaling and control transactions may augment or replace the described signaling and control transactions.

Variations

Variations and permutations of the aforementioned methods and systems are many. Consider a first example variation, in which the determination that the first subset of the data content can use a first QoS offered by a first wireless-communication network and that the second subset of the data content can use a second QoS offered by a second wireless-communication network originates at a device other than a user equipment or wireless-communication platform. In such a variation, the determination can be made by a controller that is part of a core network that supports either the user equipment or the wireless-communication platform.

A second example variation includes dual connectivity between a user equipment and wireless-communication platforms that are non-terrestrial (e.g., dual connectivity between the user equipment and a HAP and a satellite). In such an instance, connectivity (and routing of subsets of data) excludes a terrestrial base station.

A third example variation includes matching or swapping one or more radio access technologies amongst wireless-communication platforms. For example, a user equipment may access a terrestrial base station with a radio-access technology that conforms with an MSS RAT, access a satellite with a radio-access technology that conforms with a 5G NR RAT or a 3GPP LTE RAT.

A fourth example variation includes wireless-communication networks that may have a single' wireless-communication platform. For example, a satellite-based wireless-communication network, due to a span of wireless-communication coverage offered by a satellite, may utilize a single satellite (as opposed to multiple satellites as illustrated in the operating environment of FIG. 1).

A fifth example variation includes wireless-communication networks that use a hybrid of wireless-communication platforms. As an example, a wireless-communication network may use a combination of terrestrial base stations with one or more satellites and, as a result, offer a QoS that is different than a wireless-communication network that uses only terrestrial base stations or only satellites.

A sixth example variation includes applying the aforementioned methods and systems to combinations of uplink and downlink wireless-communications. As an example, a video gaming application executing on a user equipment may receive video data by way of a downlink of a terrestrial wireless-communication network offering a QoS and transmit control data by way of an uplink of a non-terrestrial wireless-communication network offering another QoS.

A seventh example variation includes applying the aforementioned methods and systems to downlink transmissions from a content service provider to a terminal device. In such an example variation, hardware of the content service provider (e.g., a server or a controller of the content service provider that is in communication with wireless-communication platforms of a terrestrial wireless-communication network and a non-terrestrial wireless-communication network), may perform operations that include assessing useable QoS's for transmitting subsets of data (of content provided by the content service provider to the terminal device) and transmitting corresponding routing command messages to the wireless-communication platforms and the terminal device in a multi-connectivity environment. The routing command messages can cause downlink transmissions of data to be divided across multiple wireless-communication networks. As an example, first video data of a first resolution may be transmitted to the terminal device using a first wireless-communication network (having a first QoS), second video data of a second resolution may be transmitted to the terminal device using a second wireless-communication network (having a second QoS), and audio data or closed captioning can be transmitted to the terminal device using a third wireless-communication network (having a third QoS). Each wireless-communication network may use a different combinations of wireless-communication platforms (terrestrial and non-terrestrial).

An eighth example variation includes applying the aforementioned methods and systems to a user equipment that is performing multiple tasks. For example, a user equipment may be performing a "live" video and audio call in parallel with a file transfer. In such an instance, audio data may be routed through a first wireless-communication network (offering a first QoS), video data may be routed through a second wireless-communication-network (offering a second QoS), and file data may be routed through third wireless-communication network (offering a third QoS). Each wireless-communication network may use different combinations of wireless-communication platforms (terrestrial and non-terrestrial).

Although techniques using, and apparatuses for, dual connectivity with a terrestrial base station and a satellite or high-altitude platform have been described in language specific to features and methods, it is to be understood that the subject of the appended claims is not necessarily limited to the specific features or methods described. Rather, the specific features and methods are disclosed as example ways in which for dual connectivity with a terrestrial base station and a satellite or high-altitude platform can be implemented.

EXAMPLES

The following paragraphs recite several examples:

Example 1

A method performed by a terrestrial platform supporting a first wireless-communication network, the method comprising: receiving, from a user equipment that is in a first engaged mode with the terrestrial platform, a message that indicates an upcoming transmission of data from the user equipment; assessing, based on contents of the message, that: transmitting a first subset of the data can use a first quality of service that is offered by the first wireless-communication network; and transmitting a second subset of the data can use a second quality of service that is offered by a second wireless-communication network; and transmitting, to the user equipment, a routing command message that directs the user equipment to: enter a second engaged mode with a non-terrestrial platform supporting the second wireless-communication network while maintaining the first engaged mode with the terrestrial platform; transmit the first subset of the data using the terrestrial platform and the first wireless-communication network; and transmit the second subset of the data using the non-terrestrial platform and the second wireless-communication network.

Example 2

The method as recited by example 1, wherein the first engaged mode with the terrestrial platform uses a first radio access technology and the second engaged mode with the non-terrestrial platform uses a second radio access technology.

Example 3

The method as recited by example 1, wherein the first engaged mode with the terrestrial platform corresponds to a radio resource control connected mode.

Example 4

The method as recited by any of examples 1 to 3, wherein the routing command message includes one or more of scheduling information, security or cryptography keys, an identity of the second wireless-communication network, or an identity of a second wireless-communication platform associated with the second wireless-communication network.

Example 5

The method as recited by any of examples 1 to 4, wherein the routing command message includes identifiers or partitioning instructions associated with the first subset of the data and the second subset of the data.

Example 6

The method as recited by any of examples 1 to 5, wherein the first subset of the data and the second subset of the data each correspond to a respective network slice.

Example 7

The method as recited by any of claims 1 to 6, wherein the terrestrial platform is a base station and the non-terrestrial platform is a satellite or a high-altitude platform.

Example 8

The method as recited by any of claims 1 to 7, further comprising the terrestrial platform determining an available capacity of the second wireless-communication network prior to transmitting the routing command message.

Example 9

A method performed by a user equipment that is in a first engaged mode with a first platform supporting a first wireless-communication network, the method comprising: transmitting, to the first platform, a message that indicates an upcoming transmission of data from the user equipment; receiving, from the first platform, a routing command message, and in response and based on contents of the routing command message: entering, while maintaining the first engaged mode with the first platform, a second engaged mode using a second platform that is supporting a second wireless-communication network, the second platform other than the first platform and the second engaged mode using a different radio access technology than the first engaged mode; transmitting, using the first platform and the first wireless-communication network, a first subset of the data, the first subset of the data requiring a first quality of service offered by the first wireless-communication network; and transmitting, using the second platform and the second wireless-communication network, a second subset of the data, the second subset of the data requiring a second quality of service offered by the second wireless-communication network.

Example 10

The method as recited by example 9, wherein the first platform is a terrestrial platform and the second platform is a non-terrestrial platform.

Example 11

The method as recited by example 9, wherein the first platform is a non-terrestrial platform and the second platform is a terrestrial platform.

Example 12

The method as recited by any of examples 9 to 11, wherein the message that indicates the upcoming transmission of data from the user equipment is an explicit message containing content that include one or more of scheduling information or a file size or type.

Example 13

The method as recited by any of examples 9 to 11, wherein the message that indicates the upcoming transmission of data from the user equipment is an explicit message containing content that includes a useable quality of service corresponding to a minimum allowable data-packet loss or a minimum allowable communication latency.

Example 14

A terrestrial platform that is part of a first wireless-communication network and comprising: a microprocessor and a computer-readable storage media, the computer-readable storage media comprising a principal routing manager having instructions that, upon execution by the microprocessor, direct the terrestrial platform to perform any method of examples 1 to 9.

Example 15

A user equipment that is in a first engaged mode with a first platform supporting a first wireless-communication network and comprising: a microprocessor and a computer-readable storage media, the computer-readable storage media comprising an agent routing manager having instructions that, upon execution by the microprocessor, direct the user equipment to perform any method of examples 10 to 13.

Example 16

A computer-readable storage media comprising instructions that, when executed by a processor, cause a device incorporating the processor to perform any of the methods of any of examples 1 to 13.

Example 17

The method as recited by example 6, where each respective network slice is an ultra-reliable low latency communication slice, a massive machine-type communications slice, or an enhanced mobile broadband slice.

What is claimed is:

1. A method performed by a terrestrial platform supporting a first wireless-communication network, the method comprising:
   receiving, from a user equipment that is in a first connected mode with the terrestrial platform, a message that indicates an upcoming transmission of data from the user equipment;
   assessing, based on contents of the message, that:
      the first wireless-communication network has a first quality of service that is suitable for transmitting a first subset of the data; and
      a second wireless-communication network has a second quality of service that is suitable for transmitting a second subset of the data; and
   transmitting, to the user equipment, a routing command message that directs the user equipment to:
      enter a second connected mode with a non-terrestrial platform supporting the second wireless-communication network while maintaining the first connected mode with the terrestrial platform;
      transmit the first subset of the data to the terrestrial platform supporting the first wireless-communication network; and
      transmit the second subset of the data to the non-terrestrial platform supporting the second wireless-communication network.

2. The method as recited by claim 1, wherein the first connected mode with the terrestrial platform uses a first radio access technology and the second connected mode with the non-terrestrial platform uses a second radio access technology.

3. The method as recited by claim 1, wherein the first connected mode with the terrestrial platform corresponds to a radio resource control connected mode.

4. The method as recited by claim 1, wherein the routing command message includes one or more of scheduling information, security keys, or cryptography keys.

5. The method as recited by claim 1, wherein the routing command message includes an identity of the second wireless-communication network or an identity of a second wireless-communication platform associated with the second wireless-communication network.

6. The method as recited by claim 1, wherein the routing command message includes identifiers or partitioning instructions associated with the first subset of the data and the second subset of the data.

7. The method as recited by claim 1, wherein the first subset of the data and the second subset of the data each are transmitted via a respective network slice.

8. The method as recited by claim 1, wherein the terrestrial platform is a base station and the non-terrestrial platform is a satellite.

9. The method as recited by claim 1, wherein the terrestrial platform is a base station and the non-terrestrial platform is a high-altitude platform.

10. The method as recited by claim 1, further comprising the terrestrial platform determining an available capacity of the second wireless-communication network prior to transmitting the routing command message.

11. A method performed by a user equipment, the method comprising:
   entering a first connected mode with a terrestrial platform that is supporting a first wireless-communication network;
   transmitting, to the terrestrial platform, a message that indicates an upcoming transmission of data from the user equipment; and
   receiving, from the terrestrial platform, a routing command message, and in response and based on contents of the routing command message:
      entering, while maintaining the first connected mode with the terrestrial platform, a second connected mode with a non-terrestrial platform that is supporting a second wireless-communication network, the second connected mode using a different radio access technology than the first connected mode;
      transmitting, to the terrestrial platform, a first subset of the data, the first subset of the data requiring a first quality of service offered by the first wireless-communication network; and
      transmitting, to the non-terrestrial platform, a second subset of the data, the second subset of the data requiring a second quality of service offered by the second wireless-communication network.

12. The method as recited by claim 11, wherein the first subset of the data is transmitted using a network slice corresponding to an ultra-reliable low-latency communication slice.

13. The method as recited by claim 12, wherein the second subset of the data is transmitted using a network slice corresponding to an enhanced mobile broadband slice.

14. The method as recited by claim 12, wherein the second subset of the data is transmitted using a network slice corresponding to a massive machine-type communications slice.

15. The method as recited by claim 11, wherein the message that indicates the upcoming transmission of data from the user equipment is an explicit message containing content that includes a useable quality of service corresponding to a maximum allowable data-packet loss.

16. The method as recited by claim 11, wherein the message that indicates the upcoming transmission of data from the user equipment is an explicit message containing content that includes a useable quality of service corresponding to a maximum allowable communication latency.

17. A terrestrial platform that is part of a first wireless-communication network and comprising:
   a microprocessor and a computer-readable storage media, the computer-readable storage media comprising a routing manager having instructions that, upon execution by the microprocessor, direct the terrestrial platform to:
      receive, from a user equipment that is in a first connected mode with the terrestrial platform, a message that indicates an upcoming transmission of data from the user equipment;
      assess, based on contents of the message, that:
         the first wireless-communication network has a first quality of service that is suitable for transmitting a first subset of the data; and
         a second wireless-communication network has a second quality of service that is suitable for transmitting a second subset of the data; and
      transmit, to the user equipment, a routing command message that directs the user equipment to:
         enter a second connected mode with a non-terrestrial platform supporting the second wireless-communication network while maintaining the first connected mode with the terrestrial platform;
         transmit the first subset of the data to the terrestrial platform supporting the first wireless-communication network; and
         transmit the second subset of the data to the non-terrestrial platform supporting the second wireless-communication network.

18. The terrestrial platform as recited by claim 17, wherein the routing command message includes scheduling information.

19. The terrestrial platform as recited by claim 17, wherein the routing command message includes data partitioning instructions.

20. The terrestrial platform as recited by claim 17, wherein the routing command message includes an indication of a radio-access technology to be used when entering the second connected mode with the non-terrestrial platform.

* * * * *